US012528087B2

(12) United States Patent
Fowler

(10) Patent No.: US 12,528,087 B2
(45) Date of Patent: Jan. 20, 2026

(54) MILLING ASSEMBLY FOR A BALL MILL

(71) Applicant: Frank Peter Fowler, Pocatello, ID (US)

(72) Inventor: Frank Peter Fowler, Pocatello, ID (US)

(73) Assignee: Frank Peter Fowler, Pocatello, ID (US)

( * ) Notice: Subject to any disclaimer, the term of this patent is extended or adjusted under 35 U.S.C. 154(b) by 381 days.

(21) Appl. No.: 17/780,324

(22) PCT Filed: Nov. 19, 2020

(86) PCT No.: PCT/EP2020/082654

§ 371 (c)(1),
(2) Date: May 26, 2022

(87) PCT Pub. No.: WO2021/104981

PCT Pub. Date: Jun. 3, 2021

(65) Prior Publication Data

US 2023/0001419 A1 Jan. 5, 2023

(30) Foreign Application Priority Data

Nov. 28, 2019 (EP) .................................... 19212227

(51) Int. Cl.

*B02C 17/14* (2006.01)
*B02C 17/08* (2006.01)
*B02C 17/18* (2006.01)

(52) U.S. Cl.

CPC .............. *B02C 17/14* (2013.01); *B02C 17/08* (2013.01); *B02C 17/18* (2013.01)

(58) Field of Classification Search

CPC ......... B02C 17/14; B02C 17/08; B02C 17/18; B02C 17/1835; B02C 17/184;

(Continued)

(56) References Cited

U.S. PATENT DOCUMENTS 238,176 A * 2/1881 Speers .................... B02C 17/18 241/293
259,670 A * 6/1882 Cowley .................. B02C 17/18 209/36

(Continued)

FOREIGN PATENT DOCUMENTS

CN 203750627 U 8/2014
CN 204672348 U 9/2015

(Continued)

OTHER PUBLICATIONS

DE4316301 Kuhnen, et alia (May 14, 1993) (MT) (Year: 1993).*

(Continued)

*Primary Examiner* — Adam J Eiseman
*Assistant Examiner* — Fred C Hammers
(74) *Attorney, Agent, or Firm* — Dinsmore & Shohl LLP

(57) ABSTRACT

A milling assembly for a ball mill has a housing for refining and separating a substrate and a collection vessel for retaining the refined substrate. The housing includes, in vertical order, a lid, at least one milling vessel for receiving milling balls, and a screen with a refining section and apertures. The collection vessel is releasably mounted to a bottom end of the housing. The housing has an orifice arranged therein. The orifice has a valve for selectively allowing gas to pass between an outside and an inside of the housing in an open position of the valve and to seal the housing against the outside in a closed position of the valve. The milling vessel includes a taper for receiving a sealing screw.

20 Claims, 5 Drawing Sheets

(58) Field of Classification Search
CPC .............. B02C 17/1855; B02C 17/185; B02C 17/1875; B02C 17/188; B02C 17/182
USPC ............................................................ 241/170
See application file for complete search history.

(56) References Cited

U.S. PATENT DOCUMENTS

| | | | | | |
|---|---|---|---|---|---|
| 670,116 | A * | 3/1901 | Sturtevant et al. | B02C 17/18 | 241/247 |
| 686,621 | A * | 11/1901 | Lindhard | B02C 17/1855 | 241/70 |
| 1,946,511 | A * | 2/1934 | Pelt | B02C 17/1855 | 241/182 |
| 2,238,743 | A * | 4/1941 | Lykken | B02C 17/14 | 241/176 |
| 2,982,485 | A * | 5/1961 | Fahrenwald | B02C 17/14 | 241/179 |
| 2,983,454 | A * | 5/1961 | Podmore, Jr. | B02C 17/14 | 241/30 |
| 4,440,351 | A * | 4/1984 | Novotny | B02C 17/18 | 366/154.1 |
| 4,811,909 | A * | 3/1989 | Inoki | B02C 23/24 | 241/285.3 |
| 6,019,300 | A * | 2/2000 | Zoz | B02C 17/16 | 241/174 |
| 2014/0319256 | A1* | 10/2014 | Knight | B02C 17/18 | 241/182 |
| 2016/0145408 | A1* | 5/2016 | Vainer | C08J 3/12 | 521/40 |
| 2018/0280987 | A1* | 10/2018 | Weiland | B02C 17/1855 | |
| 2022/0118459 | A1* | 4/2022 | Knecht | B02C 17/18 | |

FOREIGN PATENT DOCUMENTS

| | | | | |
|---|---|---|---|---|
| DE | 4316301 | A1 * | 12/1993 | B02C 17/06 |
| DE | 102008006790 | A1 | 8/2009 | |
| DE | 202017107052 | U1 | 10/2018 | |
| JP | 3222139 | U * | 4/2019 | |

OTHER PUBLICATIONS

JP2019001523 Tetsuji, et alia (Apr. 24, 2019) MT (Year: 2019).*
International Search Report dated Mar. 24, 2021; International Application No. PCT/EP2020/082654.

* cited by examiner

A - A

MILLING ASSEMBLY FOR A BALL MILL

CROSS-REFERENCE TO RELATED APPLICATIONS

This application is the U.S. National Stage of PCT/EP2020/075854 filed on Sep. 16, 2020, which claims priority to European Patent Application 19197740.4 filed on Sep. 17, 2019, the entire content of both are incorporated herein by reference in their entirety.

FIELD OF THE INVENTION

The present invention relates to a portable laboratory scale milling assembly for a ball mill with a housing for refining and separating a substrate and with a collection vessel for retaining the refined substrate, wherein the housing comprises, in vertical order a lid, at least one milling vessel for receiving milling balls and a screen with a refining section and with apertures, and wherein the collection vessel is releasably mounted to a bottom end of the housing, and wherein in the housing an orifice is arranged, wherein in the orifice a valve is arranged for selectively allowing gas to pass between an outside and an inside of the housing in an open position of the valve and to seal the housing against the outside in a closed position of the valve. The present invention also relates to a ball mill with an actuator for holding and moving a milling assembly. Furthermore, the present invention relates to a method for refining a substrate with a milling assembly.

BACKGROUND OF THE INVENTION

Ball mills of the state of the art are used to refine materials and decrease materials to particle sizes of micron or sub-micron level. Such refined particles are for instance needed for laboratory analysis testing of material samples. Ball mills usually comprise of a milling jar and a lid. The material to be refined to small particles size is inserted into the milling jar together with milling balls. The milling jar is then closed and optionally sealed. The closed milling jar is than set in motion such that the balls move inside the milling jar. During a milling process the material is exposed to the moving balls and broken down to smaller particles when in contact with the balls and a surface inside the jar. In some applications it is desirable that a maximum size of particles in not exceeded in a material sample. In some cases, it is also desirable, to have a high purity or homogeneity in the material sample and to avoid mixing of unwanted material, components, compounds or elements with the sample.

In the utility model DE 20 2017 107 052 U1 is disclosed a grinding jar and a grinding jar assembly for refining a milling material and/or for separating a milling material from at least a milling body. The utility model discloses a laboratory mill with a grinding jar with multiple grinding fractions vertically arranged above one another. The grinding jar comprises a lid and a bottom jar part. Retaining elements can be clamped between jar parts for separating grinding space fractions from each other. The retaining element can be designed as a strainer. A size of openings in the strainer can decrease from a top to a bottom, such that multiple grinding stages are formed. In operation the grinding bodies decrease a particle size of the milling material and the milling material passes through the openings of the retaining element once a particle size is small enough. According to the teaching the grinding material can be continually decreased in particle size from milling space fraction to milling space fraction. The milling material of a final particle size passes through the openings of a bottom retaining element and can be collected in a bottom jar part. The teaching of the utility model document includes to seal the grinding jar and to clamp the jar parts together. The milling jar assembly allows to decrease a milling material particle size to a very small size and ensure that milling bodies are separated from the milling material. The milling jar assembly also ensures, that the milling material particles are of a minimum size when reaching the bottom jar part.

The document CN 203 750 627 U discloses a milling assembly for a ball mill with a housing for refining and separating a substrate and with a collection vessel for retaining the refined substrate, wherein the housing comprises, in vertical order a lid, a milling vessel for receiving milling balls and a screen with a refining section and with apertures, and wherein the collection vessel is releasably mounted to a bottom end of the housing, and wherein in the housing an orifice is arranged, wherein in the orifice a valve is arranged for selectively allowing gas to pass between an outside and an inside of the housing in an open position of the valve and to seal the housing against the outside in a closed position of the valve.

SUMMARY OF THE INVENTION

It is an object of the present invention to provide a means and method to safely mill a substrate to a desired quality.

The object is achieved by a portable laboratory scale milling assembly for a ball mill as taught by claim 1 of the present invention. The object is also achieved by a ball mill according to claim 9. The object is furthermore achieved by a method for refining a substrate with a milling assembly according to claim 10. Advantageous embodiments of the milling assembly, the ball mill and advantageous steps in the method for refining the substrate are disclosed herein.

The invention discloses the technical teaching, that the milling vessel comprises a taper for receiving a sealing screw. The invention also discloses the technical teaching of a ball mill with an actuator for holding and moving a milling assembly. Furthermore the solution to the object lies in an inventive method for refining a substrate with a milling assembly comprising the step of providing a housing with a screen and with a milling vessel with balls, and with the step of inserting a substrate into a milling vessel, and with the step of inserting a sealing screw into a taper in the milling vessel, and with the step of mounting a lid to the milling vessel and sealing the housing with the lid, and with the step of closing at least one valve of an orifice to maintain an atmosphere in the housing, and with the step of milling the substrate by movement of the balls in the milling vessel, wherein the substrate is refined by contact with the balls and wherein the refined substrate passes through apertures in a screen towards a bottom end of the housing, and with the step of collecting the refined substrate in a collection vessel connected to the bottom end of the housing.

The taper and the sealing screw reinforce the cylindrical milling vessel structurally. Furthermore, the taper and sealing screw function as a deflection surface for balls inside the milling vessel and avoid damage to the lid and the orifice in the lid. The deflection surface also causes the ball to frequently come in contact with substrate and the refining section such that the substrate is refined at a high frequency. The application of the taper and the sealing screw in the milling vessel on the top end of the housing thus allows a particularly safe milling operation.

As a preferred embodiment an additional second milling vessel is arranged below the milling vessel. This arrangement allows for consecutively refining substrate to a desired particle size in a controlled environment.

According to another preferred embodiment of the present invention multiple milling vessels are arranged in vertical order below one another. This allows for consecutively refining substrate for instance to submicron level without the need of decreasing aperture size and particle size from one milling vessel to the milling vessel below at a high degree. In other words, the particle size can be decreased gradually in incremental steps.

According to yet another preferred embodiment the housing further comprises a catch basin for attachment of the collection vessel and for guiding refined substrate into the collection vessel, wherein the catch basin is mounted between the milling vessel and the collection vessel. According to another advantage, different sizes of collection vessels can be arranged, in particular when the mating dimensions of collection vessels with different sizes are the same in such a way that collection vessels with different sizes can be mutually exchanged.

The arrangement of a catch basin allows for a small collection vessel by facilitating the catch basin as an adapter piece. A small collection vessel is easy to handle and transported. The use of a catch basin particularly allows to use a screen with a comparatively large diameter and surface. Consequently, an area of the refining section of the screen is large. Consequently, the number of apertures in the screen is high. Consequently, an effective area for the milling and separation of the substrate is large and the milling operation can be performed efficiently and in a short time span.

According to another preferred embodiment of the present invention the screen is arranged, in particular clamped, between the neighboring milling vessel and/or between the milling vessel and the neighboring catch basin. This has the advantage, that an assembling of the milling assembly is eased. The use of equally dimensioned parts, in particular milling vessels, screens and a catch basin of equal or fitting diameter allows to selectively adjust the milling assembly in a modular manner to serve a specific desired milling task. A cleaning of the circular flat screen, the cylindrical tube shaped milling vessel and the round shaped catch basin is eased.

The present invention is also embodied in that the apertures in respective screens decrease in size for consecutively reducing the particle size of the substrate from a top end to the bottom end of the housing. In other words, the apertures in the screen located closest to the top end of the housing features the largest diameter. The screen closest to the bottom end of the housing and the collection vessel features the smallest diameter. The apertures are preferably circular. This allows for instance to hold back substrate, material or particles which are not yet decreased to a desirable size. Material or substrate which cannot be broken to a desired size will not pass the aperture of the respective screen. Consequently, a separation and high purity and homogeneity in the substrate is achieved. Different ball sizes or balls of different material can be used in combination with decreasing diameter of the apertures of respective screens. Thus, a selectively adjustable milling assembly to increase the efficiency of the milling operation is provided.

Advantageously the collection vessel and/or the bottom end of the housing comprises a stopcock for sealing the collection vessel and/or the housing against the outside before detaching the collection vessel from the housing. The stopcock can be arranged in the catch basin. Alternatively, a stopcock can be arranged in the bottom end of the milling vessel next to the collection vessel. In each case the stopcock on one side hinders for instance oxygen or other material to enter into the housing or into the collection vessel. Thus, a reaction of the delicate or sensitive or unstable substrate can be avoided. For instance, an oxidation of the substrate can be avoided. This is particularly critical in view to a substrate with a small particle size with a large surface to volume ratio. Another advantage of the stopcock lies in the fact, that it hinders for instance poisonous or dangerous substrate from leaving the housing or the collection vessel to enter the environment and cause harm or danger to the environment. The stopcock allows to safely retain the substrate inside the housing or inside the collection vessel. The stopcock functions as a safety device for safely transporting the milling assembly or the collection vessel or the housing to a save environment.

In a preferred embodiment the orifice comprises a filter. The filter can be a high efficiency particulate air filter (HEPA). The orifice is arranged in the wall of the housing, in particular in the wall of the milling vessel. The filter may be attached to the wall. The use of such a filter in the orifice avoids harmful material to pass between an inside of the housing and an outside of the housing when the valve of the orifice is in an open position. Also, in case of a defect valve leaking gas is filtered. The filter also avoids contamination of the substrate from gas flowing into the housing through the orifice.

The application of the aforementioned ball mill with an actuator allows for an efficient milling operation. A milling result is reproducible with an automated ball mill with an actuator.

The conduct of the aforementioned inventive method for refining the substrate with the milling assembly has the advantage, that a safe refinement in a controlled environment without the need to process or contact the substrate even until finally retained in the collection vessel is achieved.

A further preferred method step, comprises setting a desired atmosphere in the housing by evacuating or inserting a gas into the housing through the orifice. This for instance allows for controlling a chemical reaction or to avoid a chemical reaction during the milling process. The contamination of a substrate from gas can be avoided by performing a milling operation under vacuum. Also, the processing of gas contaminated from the substrate during the milling operation inside the housing can be avoided by applying a vacuum to the housing.

Yet another preferred method step, comprises the step of opening a valve to flush refined substrate particles towards the collection vessel. This can particularly be achieved by opening the valve of the orifice in the top end of the housing, particularly in the lid and letting gas pass into the vacuum of the housing. This allows for an effective milling operation without remainders of substrate particles left in the housing. This has the advantage, that a cleaning operation and handling of remaining substrate is decreased.

A further preferred method step, comprises the step of closing a stopcock in the collection vessel and/or closing a stopcock in the bottom end of the housing for sealing the inside against the outside before removing the collection vessel from the housing. This allows to avoid a dangerous material to enter the environment from the inside of the collection vessel or from the inside of the housing. This also avoids for instance gas or particles or material from the environment and the outside to enter into the inside of the housing or the inside of the collection vessel.

In yet another application the orifices can be used to clean the housing inside by flushing air from one orifice to another orifice and through the housing. In yet another application a continuous flow of gas through the housing between one orifice at a bottom end of the housing and one orifice at the top end of the housing can cause movement of particles and facilitate refinement and sieving. Depending on the gas a drying or moisting of substrate can be achieved.

In an application gas may be circulated in a closed loop between two orifices through the housing. In this setup the inside of the housing is a part of the closed loop and another part of the closed loop lies on the outside of the housing, wherein the two orifices are connected by a tube on the outside.

BRIEF DESCRIPTION OF THE DRAWINGS

The aforementioned components as well as the claimed components and the components to be used in accordance with the invention in the described embodiments, are not subject to any special exceptions with respect to their size, shape, material selection and technical concept such that the selection criteria known in the pertinent field can be applied without limitations.

DETAILED DESCRIPTION OF THE INVENTION

Figure 1:
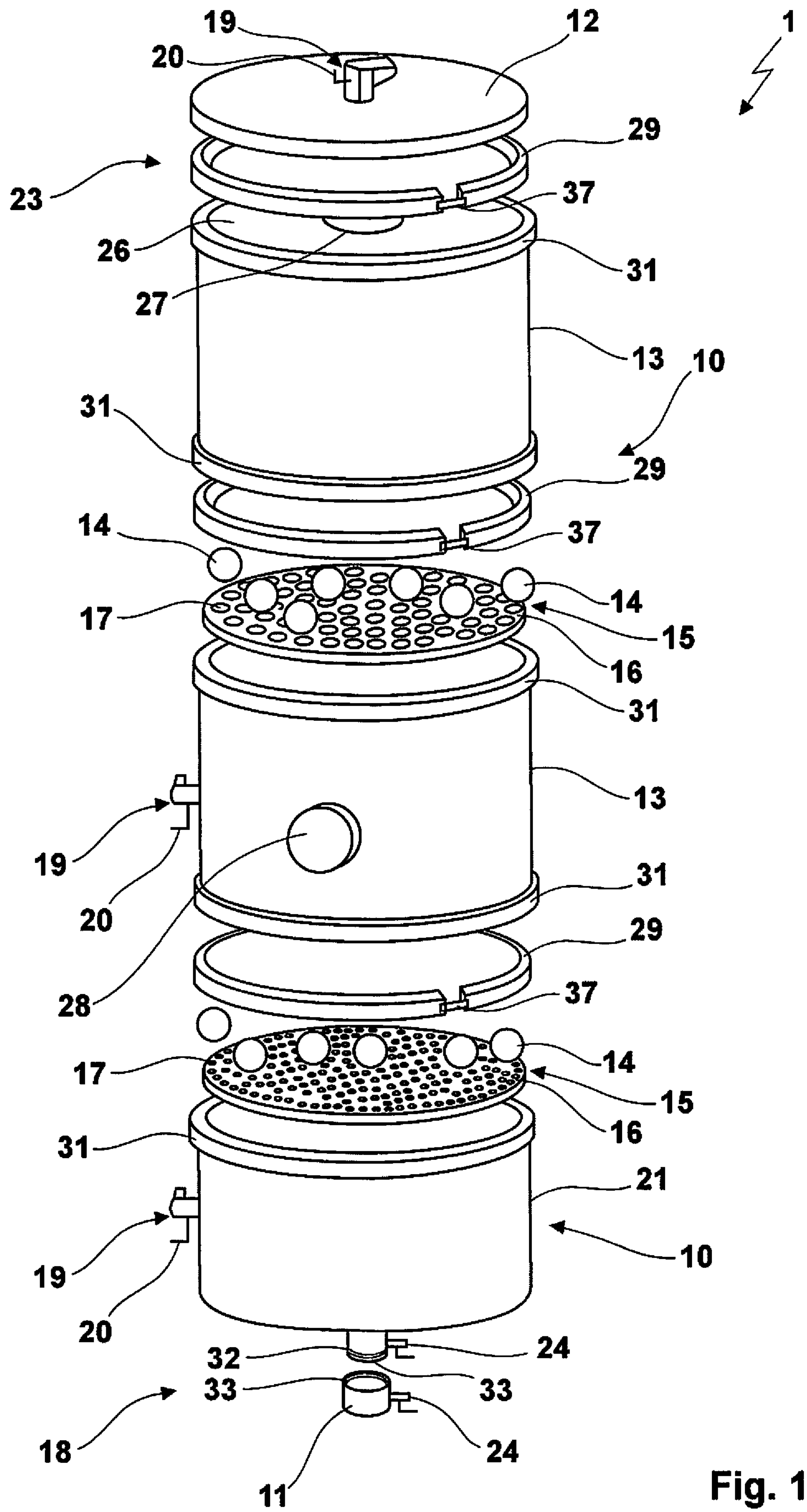
FIG. 1 depicts in a perspective view a milling assembly in an exploded view.

FIG. 1 depicts in a perspective view in an exploded view a milling assembly 1. The milling assembly 1 comprises a housing 10 and a collection vessel 11. The housing 10 comprises in vertical order from a top end 23 to a bottom end 18 a lid 12, a top end milling vessel 13, a top end screen 15, a bottom end milling vessel 13, a bottom end screen 15 and a catch basin 21. The housing 10 furthermore comprises clamping means 29 for respectively connecting the lid 12 to the milling vessel 13, for connecting top end milling vessel 13 to bottom end milling vessel 13 and for connecting the bottom end milling vessel 13 to the catch basin 21 by clamping. The components of the housing are made of stainless steel. The top end 23 of the housing is located at the lid 12 of the housing 10 in an assembled arrangement and in operative condition of the housing 10. The bottom end 18 of the housing 10 is located at an opposite end of the housing 10 relative to the top end 23 in an assembled arrangement and in operative condition of the housing 10. The bottom end 18 is located at an outlet 32 of the catch basin 21. Bottom end and top end of respective components refer to where the respective portion of a component is facing or where the respective component is located in the housing 10.

The circular and flat lid 12 features an orifice 19 with a valve 20. The orifice 19 is located in the center of the circular lid 12. An additional orifice 19 with a valve 20 is arranged in the milling vessel 13 and the catch basin 21 respectively. The milling vessel 13 comprises a socket 28 for connection with an here not depicted actuator arm of a ball mill. The top end milling vessel 13 comprises a taper 26 with a hole for receiving a sealing screw 27. The taper is a disk with a decreasing thickness of materiel towards the hole in the center. The flat circular screens 15 comprise of apertures 17 and a refining section 16. The catch basin 21 of the housing 10 features an outlet 32 in the bottom end 18 of the housing 10. In the outlet 32 arranged is a stopcock 24 for sealing the housing 10. The collection vessel 11 also comprises a stopcock 24 for sealing the collection vessel 11. The collection vessel 11 is connectable to the outlet 32 by a screw connection. The outlet 32 and the collection vessel 11 feature threads 33, such that the collection vessel 11 can be screwed onto the outlet 32. The circular top end of the catch basin 21 features a flange 31. The cylindrical top end milling vessel 13 and the cylindrical bottom end milling vessel 13 also feature flanges 31 at their respective top ends and bottom ends. The clamping means 29 may connect the lid 12 and the milling vessel 13 by encompassing the flange 31 and the lid 12 and clamping them together. A connection between the milling vessels 13 and a connection between the milling vessel 13 and catch basin 21 can be realized by the clamping means 29 encompassing two respective neighboring flanges 31. The milling vessels 13 are of cylindrical shape. A height of the milling vessel may be 15 cm a diameter of the milling vessel may be 7 cm. The clamping means 29 comprises a lever 37 for tightening and closing the clamping means 29 around a circumference of the flanges 31 and the lid.

Figure 2:
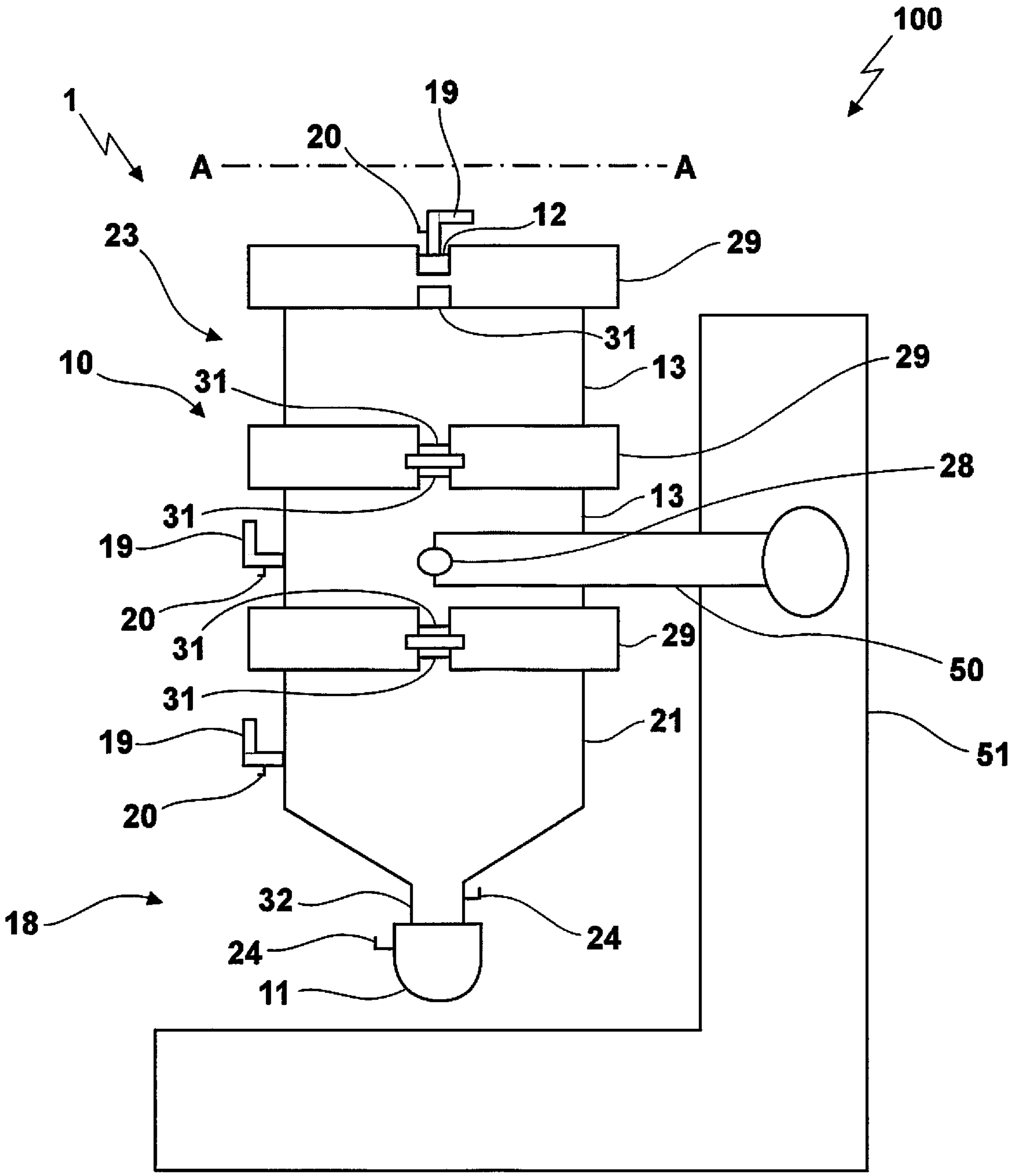
FIG. 2 depicts in a side view a ball mill with an actuator and the milling assembly attached to the actuator.

FIG. 2 depicts in a side view a ball mill 100 with a support 51 and with an actuator 50 attached to the support 51. The actuator 50 is connected to the socket 28 of the housing 10 of the milling assembly 1 to set the milling assembly 1 into motion. The actuator 50 is an air driven piston and the motion is selectable between a vibration, a rotational movement in a horizontal plane or a superimposed rotational movement in a horizontal plane or a combination thereof to set balls inside the housing 10 into motion and to achieve a sieving. In particular a milling operation and a vibratory sieving, a horizontal sieving or a tap sieving can be combined. The depicted milling assembly 1 is in an operational arrangement and entirely sealed. The sealing is realized by the clamping means 29 encompassing a flange 31 and a lid 12, and by the clamping means 29 encompassing the flanges 31 of the milling vessels 13, and by the clamping means 29 encompassing the flange 31 of the milling vessel 13 and the flange 31 of the catch basin 21. The orifice 19 in the lid 12 is closed and sealed by the valve 20. The orifice 19 in the milling vessel 13 is closed and sealed by the valve 20. The orifice 19 in the catch basin 21 is closed and sealed by the valve 20. The outlet 32 of the catch basin 21 of the housing 10 is connected to the collection vessel 11, such that the outlet 32 is also closed and sealed by the collection vessel 11. In this operational arrangement an exchange of a substrate, gas or materials between an inside of the housing 10 and the outside is avoided.

Figure 3:
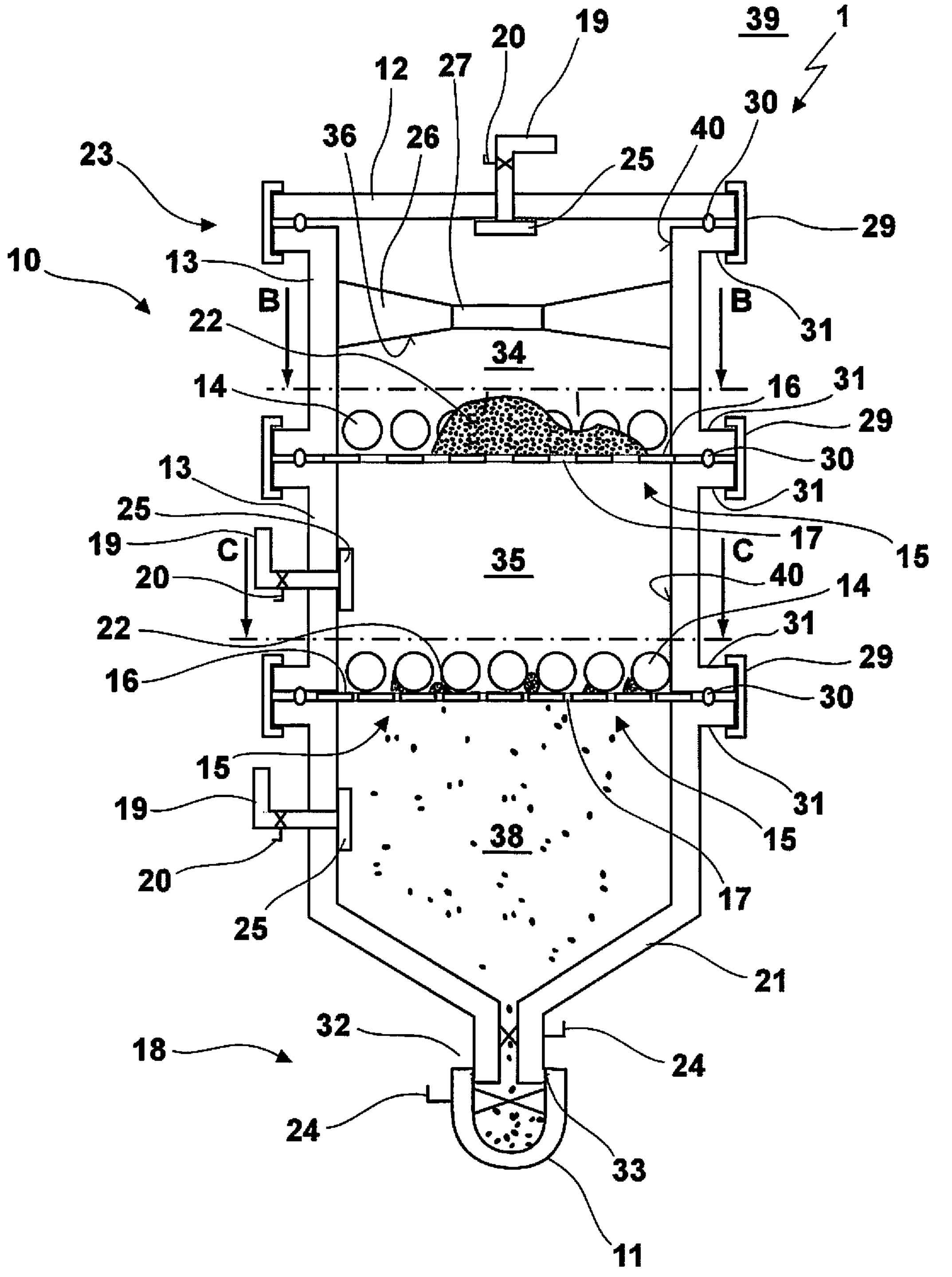
FIG. 3 depicts in a sectional view the milling assembly with a housing and a collection vessel attached to the housing.

FIG. 3 depicts a sectional view of the milling assembly 1 according to FIG. 2. The milling assembly 1 with the housing 10 and the collection vessel 11 is in the operational arrangement and the inside 38 of the housing is entirely sealed against the environment outside 39. The sealing is achieved by clamping the lid 12 to the flange 31 of the top end milling vessel 13 with the clamping means 29, wherein a gasket 30 is arranged between the lid 12 and the flange 31. The flange 31 of the top end milling vessel 13 facing the bottom end 18 and the flange 31 of the bottom end milling vessel 13 facing the top end 23 are connected by the clamping means 29, wherein the gasket 30 and the screen 15 is clamped between the flanges 31. The flange 31 of the catch basin 21 and the flange 31 of the bottom end milling vessel 13 facing the bottom end 18 are connected by the clamping means 29, wherein the gasket 30 and the screen 15 are clamped in between the flanges 31. The valves 20 are set into a closed position. The orifice 19 in the lid 12, the orifice 19 in the milling vessel 13 and the orifice 19 in the catch basin 21 are thus closed and sealed by the valves 20. The outlet 32 is closed and sealed by the collection vessel 11 screwed onto the outlet 32 by the threads 33. The stopcock 24 in the outlet 32 and the stopcock 24 in the collection vessel 11 are in an open position such that refined substrate particles 22 can fall into the catch basin 21 and further into the collection vessel 11 by gravity. The top end milling vessel 13 comprises the circular taper 26 with the sealing screw 27 screwed into the center of the taper 26. The taper is welded onto an inside wall 40 of the milling vessel 13. A deflection surface 36 is formed on a screen 15 facing side of the taper 26. The deflection surface 36 and the sealing screw 27 cause a deflection of the balls 14 and avoid the balls 14 from hitting the lid 12.

An upper milling chamber 34 is formed between the wall 40 of the top end milling vessel 13, the deflection surface 36 and, the screen 15 clamped between milling vessel 13 at the top end 23 and the milling vessel 13 at the bottom end 18. A lower milling chamber 35 is formed between the wall 40 of the bottom end milling vessel 13, the screen 15 clamped between milling vessel 13 at the top end 23 and the milling vessel 13 at the bottom end 18, and the screen 15 clamped between the milling vessel 13 at the bottom end 18 and the catch basin 21. The screen 15 of the upper milling chamber 34 and the screen 15 of the lower milling chamber 35 at the bottom end 18 comprise of the apertures 17 and the refining sections 16 respectively. The upper milling chamber 34 and the lower milling chamber 35 is filled with milling balls 14 and the substrate 22 to be refined. In a first step before the milling operation the substrate 22 is filled into the upper milling chamber 34 from a top end 23 through the hole in the taper 26. In a second step the sealing screw 27 is screwed into the hole of the taper 26. In a further step the lid 12 is mounted to the top end milling vessel 13 by the clamping means 29. In a further step the housing 10 is evacuated through the orifice 19 such that the sealed milling assembly 1 is set under vacuum. During the evacuation process filters 25 of the orifice 19 filter the gas sucked from the inside 38 of the housing 10 such that no substrate, particles or harmful components or material in the gas enter the outside 39 of the housing 10. In a subsequent step the valves 20 of the orifice 19 are set to a closed position to maintain the vacuum. During the milling operation the milling assembly 1 is set in motion, such that the balls 14 move and refine the substrate 22 by breaking it up into particles under contact with the balls 14 and under contact with the refining section 16 of the screen 15. The diameter of the apertures 17 in the screen 15 of the upper milling chamber 34 is larger than the diameter of the apertures 17 in the screen 15 of the lower milling chamber 35. Once the substrate 22 is broken down to a particle size which allows a passage through the aperture 17 of the screen 15 of the upper milling chamber 34 by gravity, it will fall into the lower milling chamber 35. The particles of the substrate 22 in the lower milling chamber 35 are again refined. Once the particles have a size small enough to pass through the apertures 17 in the screen 15 of the lower milling chamber 35 the particles of the substrate 22 will fall into the catch basin 21. Then the particles of the substrate 22 will fall or slide further into the collection vessel 11 under the influence of gravity and movement from the actuator. This ensures, that only particles of a size smaller than the diameter of the apertures 17 of the lower milling chamber 35 are collected. Furthermore, it is ensured that the substrate 22 is separated from the milling balls 14 in the milling process. These two aspects are not achievable with a conventional milling jar, where only by statistical probability and the original quality of the substrate 22 a particle size is determined. The aforesaid separation of milling balls 14 from the substrate 22 is also not possible with a conventional milling jar.

During the milling operation the stopcock 24 of the outlet 32 of the catch basin 21 and the stopcock 24 of the collection vessel 11 are open, such that the refined substrate particles 22 can fall through the outlet 32 into the collection vessel 11. Once the substrate 22 is entirely refined and has passed the upper milling chamber 34, the lower milling chamber 35, the catch basin 21 and is collected in the collection vessel 11 the stopcock 24 of the outlet 32 is closed and the stopcock 24 of the collection vessel 11 is closed. After closing of the stopcock 24 of the catch basin 21 and after closing of the stopcock 24 of the collection vessel 11, the collection vessel 11 can be screwed of the catch basin 21. With the closed stopcock 24 the refined substrate 22 remains in a vacuum and is sealed from the outside 39. This has the advantage, that an undesirable reaction between the particles of the substrate 22 and the environment, in particular air is avoided. This also has the advantage that a contamination of the environment outside 39 with the refined particles of the substrate 22 is avoided.

In an alternative operation the sealing screw 27 is not screwed into the taper 26. This allows that remaining particles of the substrate 22 can be flushed into the collection vessel 11 by setting the valve 20 of the orifice 19 in the lid 12 from the close position of the valve 20 to the open position of the valve 20. In the open position of the valve 20 air from the outside 39 flows into the housing 10 due to the low pressure from the vacuum. With inflowing air remaining particles of the substrate 22 are flushed towards and into the collection vessel 11.

The orifice 19 in particular in the lid 12 may feature an adapter arrangement with an exchangeable coupling part for a tubing with different sizes. This makes possible that tubes with different sizes and diameters can be attached to the orifice 19.

Figure 4A:
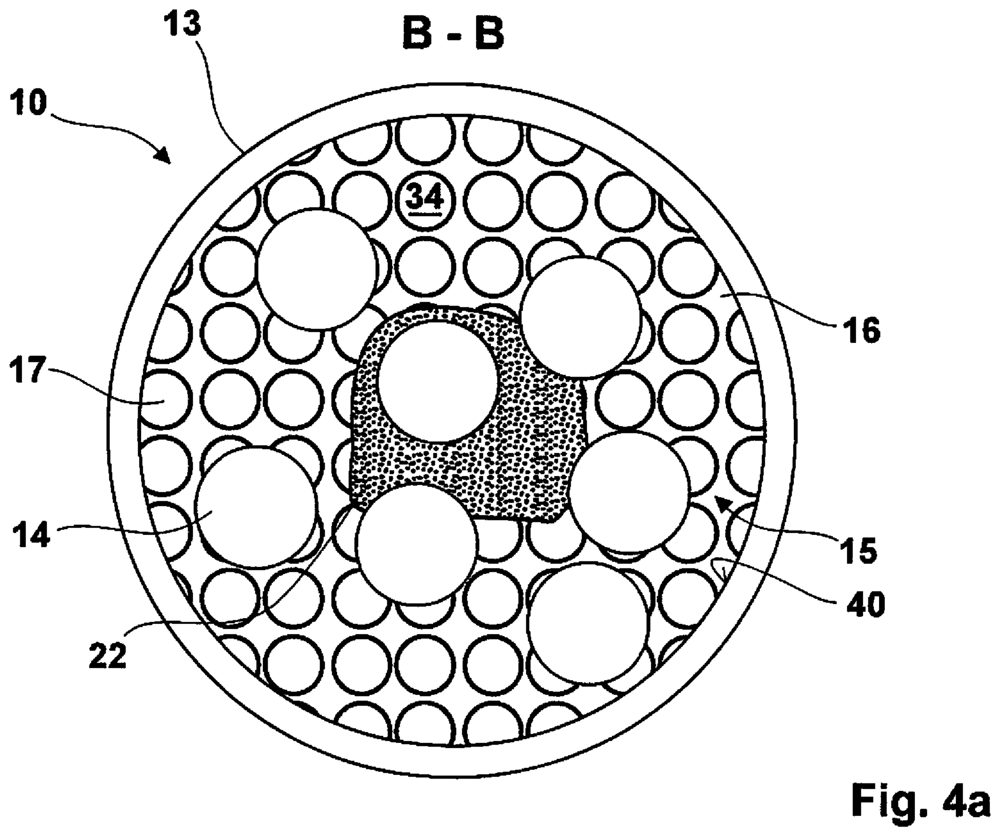
FIG. 4*a* depicts in a sectional view according to FIG. 3 a view into an upper milling chamber with a first screen, milling balls and a substrate.

FIG. 4*a* depicts a sectional view into the upper milling chamber 34 from the top end according to FIG. 3. The FIG. 4*a* depicts the milling vessel 13 located at the top end of the housing 10. Visible is the wall 40, of the milling vessel 13 and the screen 15 clamped between the top end milling vessel 13 and the bottom end milling vessel 13. The screen 15 of the upper milling chamber 34 comprises of the apertures 17 and the refining section 16. The apertures 17 are of equal diameter and evenly distributed over the screen 15. A chunk of the substrate 22 and milling balls 14 rest on the screen 15. In operation the balls 14 are set in motion and break up the substrate 22 between the ball 14 and the refining section 16 to smaller chunks and further on to a particle size which allows the particles to pass through the apertures 17 of the screen 15 of the upper milling chamber 34.

Figure 4B:
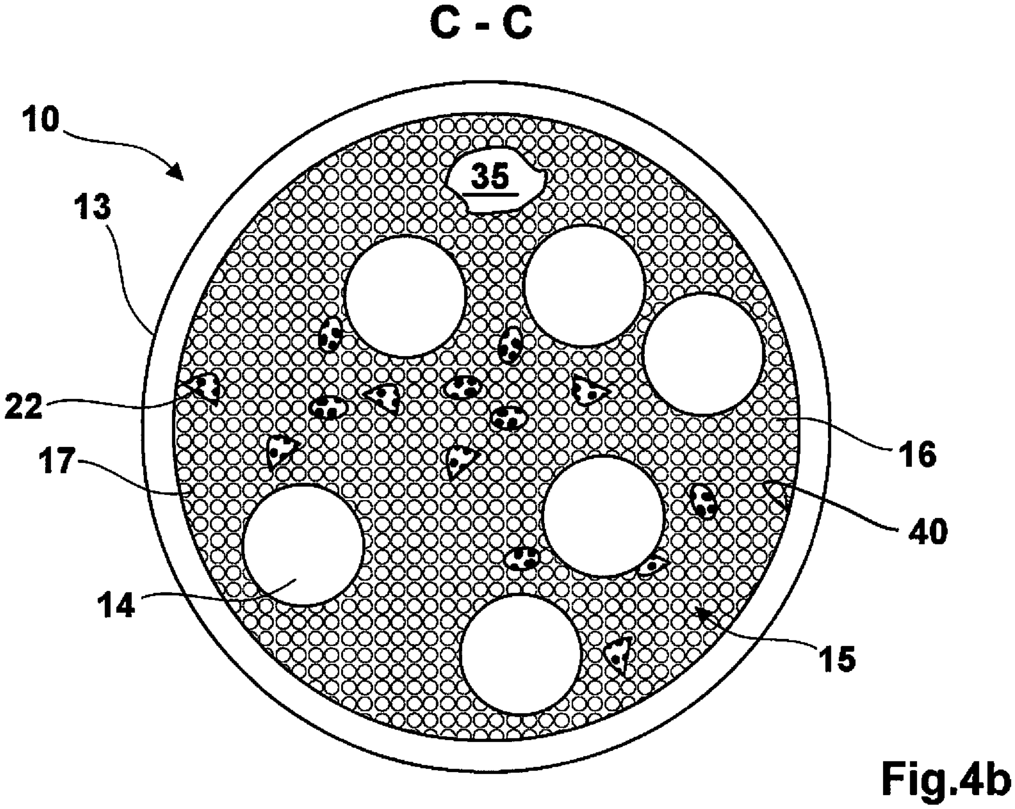
FIG. 4*b* depicts in a sectional view according to FIG. 3 a view into a bottom milling chamber with a screen, milling balls and the substrate to be further refined.

FIG. 4*b* depicts a view into the lower milling chamber 35 in a sectional view according to FIG. 3. Depicted is an outer circumference with the wall 40 of the milling vessel 13 at the bottom end. Also depicted is the screen 15 of the lower milling chamber 35 clamped between the bottom end milling vessel 13 and the catch basin. Particles of the substrate 22 and milling balls rest on the screen 15. The particles of the substrate 22 are of a size small enough, that they have passed the apertures of the screen of the upper milling chamber. Yet the particles have a size that is too large to pass the apertures of the lower milling chamber 35. The screen 15 of the lower milling chamber 35 comprises of the refining section 16 and apertures 17 of a diameter smaller than the diameter of the apertures of the screen of the upper milling chamber. In operation the milling balls 14 are set in motion to further break up the particles of the substrate 22 by interaction between the balls 14 and the refining surface 16. Once the particles reach a size small enough, they fall through the apertures 17 of the screen 15. Material and particles which cannot be broken down to the size of the apertures 17 or smaller will remain in the lower milling chamber 35 and cannot pass on into the catch basin 21 and the collection vessel 11.

Figure 5:
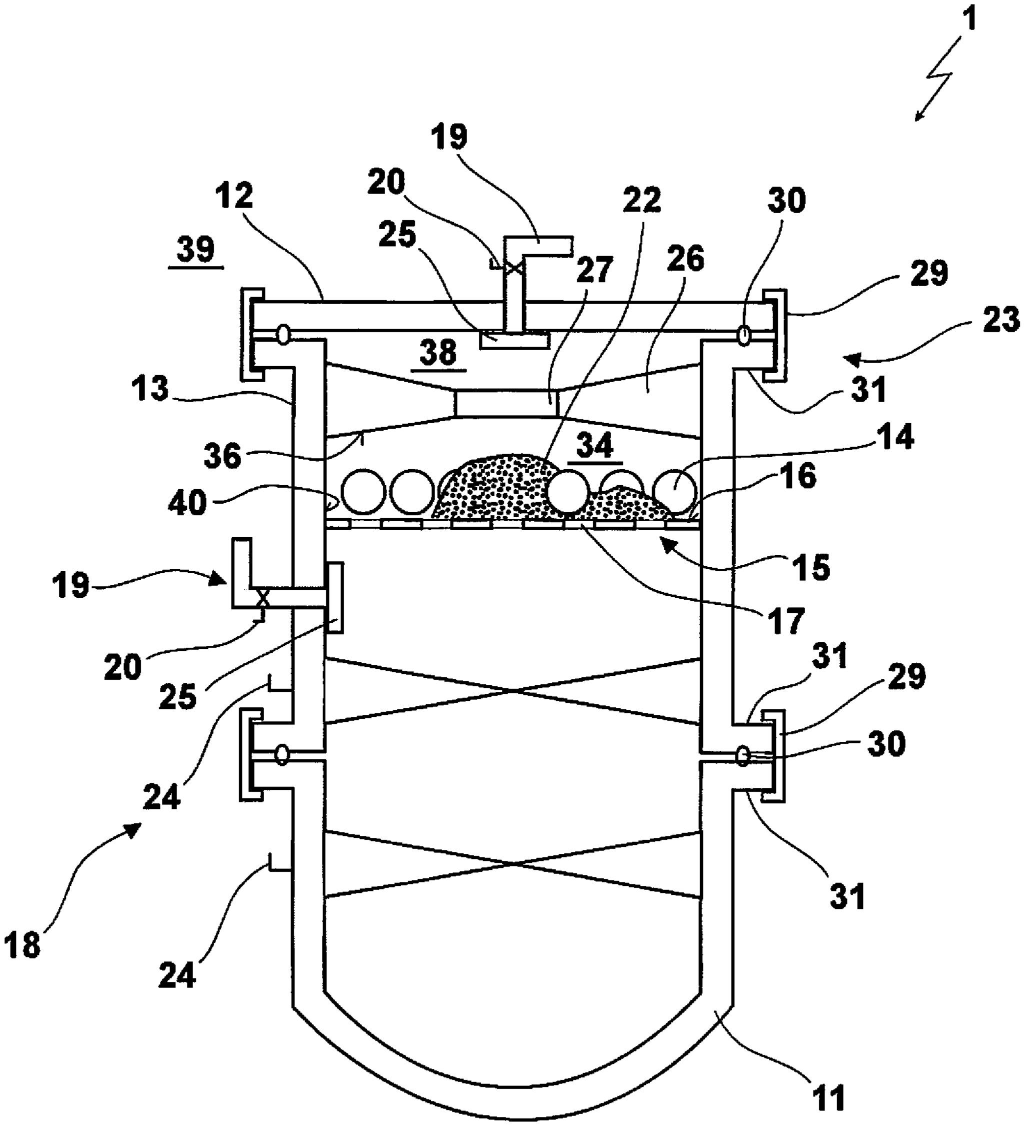
FIG. 5 depicts an alternative embodiment of the milling assembly in a sectional side view.

FIG. 5 depicts an alternative embodiment of the milling vessel 13 according to the invention. In this embodiment the milling vessel 13 comprises of only a single upper milling chamber 34. The housing 10 of the milling assembly 1 comprises of the lid 12, the milling vessel 13 and the clamping means 29. The screen 15 is fixed inside the milling vessel 13 to the wall 40 and comprises of the apertures 17 and the refining section 16. The taper 26 with the sealing screw 27 is also fixed to the wall 40 of the milling vessel 13 on the inside 38 above the screen 15. The upper milling chamber 34 is formed between the screen 15, the taper 26 with the sealing screw 27 and the surrounding milling vessel 13. The lid 12 is fixed and sealed to the milling vessel 13 by the clamping means 29. The clamping means 29 encompass the lid 12 and the flange 31, wherein the gasket 30 is arranged between the lid 12 and the flange 31. The stopcock 24 is arranged in the bottom end 18 of the housing 10. The housing 10 is formed by the milling vessel 13 and the lid 12. The orifice 19 with the valve 20 and the filter 25 is arranged in the lid 12 and another orifice 19 with the valve 20 and the filter 25 is arranged in the milling vessel 13 between the screen 15 and the stopcock 24. The filter 25 of the orifice 19 is arranged on the wall 40 on the inside 38 of the housing 10. Gas flowing through the orifice 19 into the housing 10 or out of the housing 10 is filtered. The upper milling chamber 34 is enclosed by the deflection surface 36 formed by the taper 26 and the sealing screw 27. The milling vessel 13 is directly connected to the collection vessel 11. The connection is realized by the clamping means 29. The flange 31 of the collection vessel 11 is clamped to the flange 31 of the milling vessel 13 which is facing the bottom end 18. The gasket 30 is arranged between the flanges 31. The collection vessel 11 comprises the stopcock 24. In the milling operation the balls 14 break up the substrate 22 to particles which can pass through the apertures 17 and fall into the collection vessel 11. The sealed milling assembly 1 can be evacuated or filled with an inert gas to avoid a reaction of the substrate 22 with oxygen. Once the substrate 22 has passed through the apertures 17 of the screen 15 and is collected in the collection vessel 11, the stopcock 24 of the collection vessel 11 and the stopcock 24 of the milling vessel 13 can be closed. The stopcocks 24 can be closed by setting the stopcock 24 into a closed position. In a subsequent step the housing 10 and the collection vessel 11 can be disconnected from one another while retaining the previously set atmosphere, where the substrate 20 particles are surrounded by an inert gas. The closed stopcocks 24 also avoid the substrate 22 particles or remainders from the inside 38 to pass to the environment outside 39.

LIST OF NUMERALS

1 milling assembly
10 housing
11 collection vessel
12 lid
13 milling vessel
14 ball
15 screen
16 refining section
17 aperture
18 bottom end
19 orifice
20 valve
21 catch basin
22 substrate
23 top end
24 stopcock
25 filter
26 taper
27 sealing screw
28 socket
29 clamping means
30 gasket
31 flange
32 outlet
33 thread
34 upper milling chamber
35 lower milling chamber
36 deflection surface
37 lever
38 inside
39 outside
40 wall
50 actuator
51 support
100 ball mill

The invention claimed is:

1. A milling assembly for a ball mill, comprising:

a housing for refining and separating a substrate;

a collection vessel for retaining the refined substrate;

wherein the housing comprises, in vertical order:

a lid;

at least one milling vessel configured to receive milling balls;

a screen with a refining section and apertures; and a bottom end;

the at least one milling vessel having a disk disposed above the screen, the disk having an opening therethru and a lower surface that faces the screen, the lower surface sloping upwardly from an outer perimeter of the disk to a center of the disk;

wherein the collection vessel is releasably mounted to the bottom end of the housing; and an orifice is arranged in the housing, the orifice having a valve arranged therein for selectively allowing gas to pass between an outside and an inside of the housing in an open position of the valve and to seal the housing against the outside in a closed position of the valve.

2. The milling assembly according to claim 1, wherein the at least one milling vessel comprises a first milling vessel and a further milling vessel is arranged below the first milling vessel.

3. The milling assembly according to claim 1, wherein the at least one milling vessel comprises multiple milling vessels arranged in vertical order below one another.

4. The milling assembly according to claim 2, wherein the housing further comprises a catch basin configured for attachment of the collection vessel and for guiding refined substrate into the collection vessel, the catch basin being mounted between the milling vessel and the collection vessel.

5. The milling assembly according to claim 4, wherein the collection vessel comprises a selection from a plurality of collection vessels having different sizes.

6. The milling assembly according to claim 4, wherein the screen is arranged between the neighboring ones of the milling vessels and/or between the one of the milling vessels and the catch basin.

7. The milling assembly according to claim 6, wherein the screen is clamped between the respective vessels or vessel and catch basin.

8. The milling assembly according to claim 6, wherein the screen comprises a plurality of screens and apertures in the screens decrease in size for consecutively reducing the particle size of the substrate from a top end to the bottom end of the housing.

9. The milling assembly according to claim 6, wherein the bottom end of the housing comprises a stopcock for sealing the housing against the outside before detaching the collection vessel from the housing.

10. The milling assembly according to claim 1, wherein the orifice further comprises a filter.

11. The milling assembly according to claim 1, wherein the milling assembly is a portable milling assembly.

12. A ball mill comprising:

the milling assembly according to claim 1; and an actuator configured to hold and move the milling assembly.

13. A method for refining a substrate with a milling assembly, comprising the steps of:

providing a housing according to claim 1;

inserting a substrate into the milling vessel;

mounting the lid to the milling vessel and sealing the housing with the lid after inserting the substrate into the milling vessel;

closing the valve of the orifice to maintain an atmosphere in the housing;

milling the substrate by movement of the balls in the milling vessel such that the substrate is refined by contact with the balls and the refined substrate passes through the apertures in the screen towards the bottom end of the housing; and collecting the refined substrate in the collection vessel connected to the bottom end of the housing.

14. The method for refining a substrate with a milling assembly according to claim 13, further comprising the step of setting a desired atmosphere in the housing by evacuating or inserting gas into the housing through the orifice.

15. The method for refining a substrate with a milling assembly according to claim 13, further comprising the step of opening the valve to flush the refined substrate particles towards the collection vessel.

16. The method for refining a substrate with a milling assembly according to claim 13, further comprising the step of closing a stopcock in the collection vessel and/or closing a stopcock in the bottom end of the housing for sealing an inside against the outside before removing the collection vessel from the housing.

17. The milling assembly according to claim 1, wherein the disk is a tapered disk and the hole is disposed through the center of the disk, the lower surface tapering upwardly from the outer perimeter to the hole.

18. The milling assembly according to claim 17, wherein the disk has an upper surface that tapers downwardly from the outer perimeter to the hole.

19. The milling assembly according to claim 1, further comprising a sealing screw selectively engaging the hole in the disk.

20. The milling assembly according to claim 1, wherein the housing is configured such that when in use, the lid is above the at least one milling vessel with respect to the downward direction of gravity.

* * * * *